United States Patent
Kim et al.

(10) Patent No.: US 9,929,666 B2
(45) Date of Patent: Mar. 27, 2018

(54) DATA PROCESSING DEVICE AND METHOD FOR HIGH VOLTAGE DIRECT CURRENT TRANSMISSION SYSTEM

(71) Applicant: LSIS CO., LTD., Anyang-si, Gyeonggi-do (KR)

(72) Inventors: Eung Soo Kim, Anyang-si (KR); Jong Bae Kim, Seoul (KR); Seung Hun Lee, Namyangju-si (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 69 days.

(21) Appl. No.: 15/073,985

(22) Filed: Mar. 18, 2016

(65) Prior Publication Data
US 2016/0285379 A1    Sep. 29, 2016

(30) Foreign Application Priority Data

Mar. 23, 2015  (KR) .................. 10-2015-0040246

(51) Int. Cl.
| | |
|---|---|
| *H02M 5/44* | (2006.01) |
| *H02J 3/36* | (2006.01) |
| *H02J 13/00* | (2006.01) |

(52) U.S. Cl.
CPC .............. *H02M 5/44* (2013.01); *H02J 3/36* (2013.01); *H02J 13/0096* (2013.01); *Y02E 60/60* (2013.01)

(58) Field of Classification Search
CPC ........ H02M 5/44; H02J 13/0096; Y02E 60/60
See application file for complete search history.

(56) References Cited

U.S. PATENT DOCUMENTS

| | | |
|---|---|---|
| 2008/0198037 A1 | 8/2008 | Hugelschafer et al. |
| 2009/0184835 A1 | 7/2009 | Deaver |
| 2012/0065802 A1 | 3/2012 | Seeber et al. |
| 2013/0057339 A1 | 3/2013 | Koudar |

FOREIGN PATENT DOCUMENTS

| | | |
|---|---|---|
| CN | 101194455 B | 12/2010 |
| EP | 2822145 A1 | 1/2015 |
| JP | 03070297 | 3/1991 |
| JP | 6-237259 | 8/1994 |
| JP | 7-67242 | 3/1995 |
| JP | 2000032013 | 1/2000 |

(Continued)

OTHER PUBLICATIONS

European Patent Office Application Serial No. 16156154.3, Search Report dated Aug. 5, 2016, 7 pages.

(Continued)

*Primary Examiner* — Kyle J Moody
(74) *Attorney, Agent, or Firm* — K&L Gates LLP

(57) ABSTRACT

A data processing device for a high voltage direct current (HVDC) transmission system is provided. The data processing device includes a plurality of measuring interface systems (MIS) for measuring a voltage or current in an HVDC transmission system; a bus for transmitting data on the plurality of MISs; and an optical distribution module (ODM) transmitting the data transmitted through the bus to the HVDC transmission system, wherein the plurality of MISs increases counter values according to a data transmission completion signal of the ODM, and an MIS corresponding to the counter value among the plurality of MISs transmits data to the ODM through the bus.

5 Claims, 6 Drawing Sheets

(56) References Cited

FOREIGN PATENT DOCUMENTS

| JP | 2000092089 | 3/2000 |
| --- | --- | --- |
| JP | 2011-0147334 | 7/2011 |
| KR | 10-2013-0035766 | 4/2013 |
| KR | 10-1342333 | 12/2013 |
| KR | 10-2014-0008768 | 1/2014 |
| KR | 10-2014-0036552 | 3/2014 |
| WO | 2013178249 | 12/2013 |

OTHER PUBLICATIONS

Japan Patent Office Application No. 2016-046830, Notice of Allowance dated Feb. 7, 2017, 3 pages.
Korean Intellectual Property Office Application Serial No. 10-2015-0040246, Notice of Allowance dated Jul. 8 20, 2016, 2 pages.
Zhu, et al; "An Additional Frequency Control Strategy for Interconnected Systems Through VSC-HVDC"; Automation of Electric Power Systems; vol. 38, No. 16; Aug. 25, 2014; (7 pages).
Chinese Office Action for related Chinese Application No. 201610161166.0; action dated Jan. 3, 2018; (6 pages).

DATA PROCESSING DEVICE AND METHOD FOR HIGH VOLTAGE DIRECT CURRENT TRANSMISSION SYSTEM

CROSS-REFERENCE TO RELATED APPLICATIONS

Pursuant to 35 U.S.C. § 119(a), this application claims the benefit of earlier filing date and right of priority to Korean Patent Application No. 10-2015-0040246 filed on Mar. 23, 2015, the contents of which are all hereby incorporated by reference herein in its entirety.

BACKGROUND

The present invention relates to a data processing device and method for a high voltage direct current (HVDC) transmission system.

High voltage direct current (HVDC) transmission indicates converting alternating current (AC) power produced at a power station into DC power by a transmission site to transmit the DC power, and then re-converting the DC power into the AC power by a reception site to supplying the AC power.

An HVDC transmission system is applied to submarine cable power transmission, large-amount long-distance power transmission, interconnection between AC systems, etc. Also, the HVDC transmission system enables different frequency systems interconnection and asynchronism interconnection.

The transmission site converts the AC power into the DC power. That is, since transmitting the AC power by using a submarine cable is significantly dangerous, the transmission site converts the AC power into the DC power to transmit the DC power to the reception site.

Such an HVDC transmission system uses the measurement of a voltage/current on one or more points to control a system.

The HVDC system includes a plurality of measuring interface systems (MIS) for measuring the voltage/current. The MIS transmits the measurement of the voltage or current to a control part through an optical distribution module (ODM). That is, the ODM transmits data from the plurality of MIS s to the control part of the HVDC system.

In this case, since the plurality of MISs is connected to a single ODM and transmits a lot of data to the ODM, an arbiter module that may perform arbitration is added so that a specific MIS may occupy the bus to transmit data, or time division multiplexing (TDM) is used in which an MIS occupying the bus varies over time.

However, in the method of using the arbiter module, the arbiter module arbitrates so that the plurality of MISs may sequentially occupy the bus to transmit data but a signal approving the usage of the bus is transmitted in a Daisy-Chain style among the plurality of MISs, thus when an intermediate MIS is out of order or empty, there is a limitation in that the following MIS may not transmit data.

Even in the TDM scheme, data is transmitted in the Daisy-Chain style, thus when an intermediate MIS is out of order or empty, there is a limitation in that the following MIS may not transmit data, and since there are many cases where data is transmitted in series and is bypassed, there is a limitation in that there is a high probability of errors in the data transmission process.

SUMMARY

Embodiments provide a data processing device and method for a high voltage direct current (HVDC) transmission system that enables a plurality of measuring interface systems (MIS) to effectively transmit data to an optical distribution module (ODM).

Embodiments also provide a data processing device and method for an HVDC transmission system that enables another MIS to transmit data to the ODM even when any one of the plurality of MISs is out of order or empty.

In one embodiment, a data processing device for a high voltage direct current (HVDC) transmission system includes a plurality of measuring interface systems (MIS) for measuring a voltage or current in an HVDC transmission system; a bus for transmitting data on the plurality of MISs; and an optical distribution module (ODM) transmitting the data transmitted through the bus to the HVDC transmission system, wherein the plurality of MISs increases counter values according to a data transmission completion signal of the ODM, and an MIS corresponding to the counter value among the plurality of MISs transmits data to the ODM through the bus.

There is an advantage in that embodiments provide a data processing device and method for an HVDC transmission system that enables a plurality of MISs to effectively transmit data to an ODM.

There is also an advantage in that embodiments provide a data processing device and method for an HVDC transmission system that enables another MIS to transmit data to the ODM even when any one of the plurality of MISs is out of order or empty.

The details of one or more embodiments are set forth in the accompanying drawings and the description below. Other features will be apparent from the description and drawings, and from the claims.

DETAILED DESCRIPTION OF THE EMBODIMENTS

In the following, a data processing device and method for a high voltage direct current (HVDC) transmission system according to an embodiment is described in detail with reference to the accompanying drawings.

Figure 1:
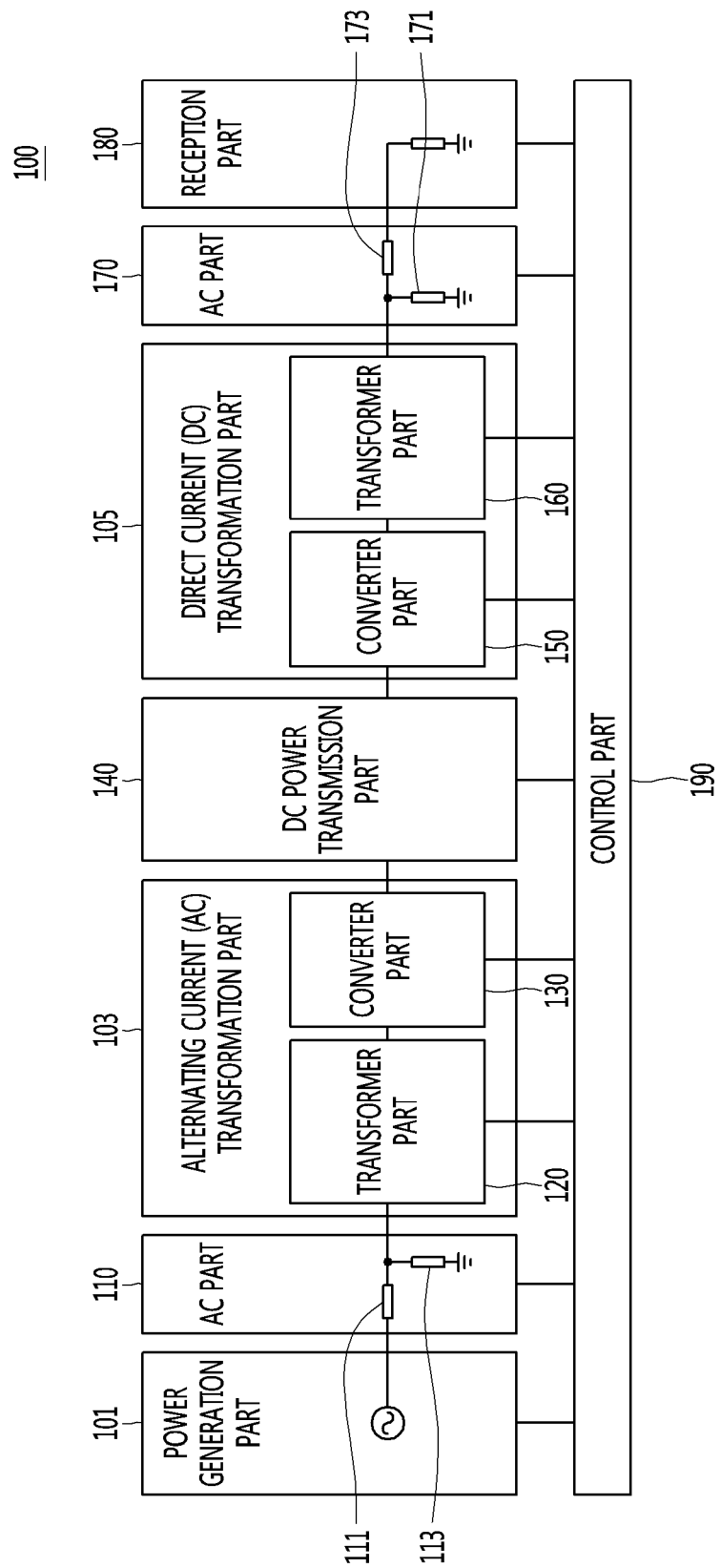
FIG. 1 is a diagram for explaining the configuration of a high voltage direct current (HVDC) transmission system according to an embodiment.

FIG. 1 shows a high voltage direct current (HVDC) transmission system according to an embodiment.

As shown in FIG. 1, an HVDC transmission system 100 according to an embodiment includes a power generation part 101, a transmission-side alternating current (AC) part 110, a transmission-side direct current (DC) transformation part 103, a DC transmission part 140, a reception-side DC transformation part 105, a reception-side AC part 170, a reception part 180, and a control part 190. The transmission-side DC transformation part 103 includes a transmission-side transformer part 120, and a transmission-side AC/DC converter part 130. The reception-side DC transformation part 105 includes a reception-side DC/AC converter part 150, and a reception-side transformer part 160.

The power generation part 101 generates three-phase AC power. The power generation part 101 may include a plurality of power stations.

The transmission-side AC part 110 transmits the three-phase AC power generated by the power generation part 101 to a DC substation that includes the transmission-side transformer part 120 and the transmission-side AC/DC converter part 130.

The transmission-side transformer part 120 isolates the transmission-side AC part 110 from the transmission-side AC/DC converter part 130 and the DC transmission part 140.

The transmission-side AC/DC converter part 130 converts, into AC power, three-phase AC power corresponding to the output of the transmission-side transformer part 120.

The DC transmission part 140 transmits transmission-side DC power to a reception side.

The reception-side DC/AC converter part 150 converts DC power transmitted by the DC transmission part 140, into three-phase AC power.

The reception-side transformer part 160 isolates the reception-side AC part 170 from the reception-side DC/AC converter part 150 and the DC transmission part 140.

The reception-side AC part 170 provides, to the reception part 180, three-phase AC power corresponding to the output of the reception-side transformer part 160.

The control part 190 controls at least one of the power generation part 101, the transmission-side AC part 110, the transmission-side DC transformation part 103, the DC transmission part 140, the reception-side DC transformation part 105, the reception-side AC part 170, the reception part 180, the transmission-side AC/DC converter part 130, and the reception-side DC/AC converter part 150. In particular, the control part 190 may control the turn-on and turn-off timings of a plurality of valves in the transmission-side AC/DC converter part 130 and the reception-side AC/DC converter part 150. In this case, the valve may correspond to a thyristor or insulated gate bipolar transistor (IGBT).

Figure 2:
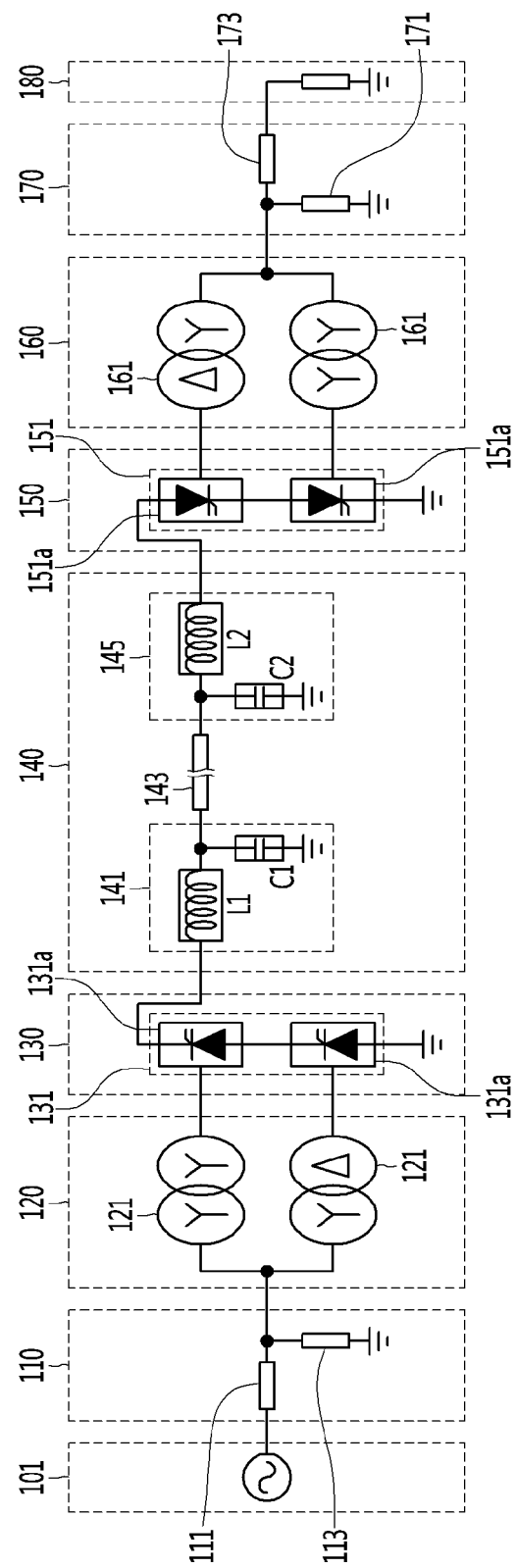
FIG. 2 is a diagram for explaining the configuration of a mono-polar HVDC transmission system according to an embodiment.

FIG. 2 shows a mono-polar HVDC transmission system according to an embodiment.

In particular, FIG. 2 shows a system transmitting single pole DC power. Although it is assumed in the following description that the single pole is a positive pole, there is no need to be limited thereto.

The transmission-side AC part 110 includes an AC transmission line 111 and an AC filter 113.

The AC transmission line 111 transmits three-phase AC power generated by the power generation part 101, to the transmission-side DC transformation part 103.

The AC filter 113 removes other frequency components excluding frequency components used by the DC transformation part 103, from the transmitted three-phase AC power.

The transmission-side transformer part 120 includes one or more transformers 121 for the positive pole. For the positive pole, the transmission-side AC/DC converter part 130 includes an AC/positive-pole DC converter 131 generating positive-pole DC power, and the AC/positive-pole DC converter 131 includes one or more three-phase valve bridges 131a corresponding to the one or more transformers 121, respectively.

When one three-phase valve bridge 131a is used, the AC/positive-pole DC converter 131 may use AC power to generate positive-pole DC power having six pulses. In this case, the primary and secondary coils of the transformer 121 of the valve bridge may have a Y-Y connection or Y-Δ connection.

When two three-phase valve bridges 131a are used, the AC/positive-pole DC converter 131 may use AC power to generate positive-pole DC power having 12 pulses. In this case, the primary and secondary coils of the transformer 121 of one of the two valve bridges may have a Y-Y connection, and the primary and secondary coils of the transformer 121 of the other of the two valve bridges may have a Y-Δ connection.

When three three-phase valve bridges 131a are used, the AC/positive-pole DC converter 131 may use AC power to generate positive-pole DC power having 18 pulses. The more the number of pulses of the positive-pole DC power, the price of the filter may decrease.

The DC transmission part 140 includes a transmission-side positive-pole DC filter 141, a positive-pole DC transmission line 143, and a reception-side positive-pole DC filter 145. The transmission-side positive-pole DC filter 141 includes an inductor L1 and a capacitor C1 and DC-filters positive-pole DC power output by the AC/positive-pole DC converter 131.

The positive-pole DC transmission line 143 may have a DC line for transmission of positive-pole DC power, and earth may be used as a current feedback path. One or more switches may be disposed on the DC line.

The reception-side positive-pole DC filter 145 includes an inductor L2 and a capacitor C2 and DC-filters positive-pole DC power transmitted through the positive-pole DC transmission line 143.

The reception-side DC/AC converter part 150 includes a positive DC/AC converter 151, which includes one or more three-phase valve bridges 151a.

The reception-side transformer part 160 includes one or more transformers 161 corresponding respectively to one or more three-phase valve bridges 151a for the positive pole.

When one three-phase valve bridge 151a is used, the positive-pole DC/AC converter 151 may use positive-pole DC power to generate AC power having six pulses. In this case, the primary and secondary coils of the transformer 161 of the valve bridge may have a Y-Y connection or Y-Δ connection.

When two three-phase valve bridges 151a are used, the positive-pole DC/AC converter 151 may use positive-pole DC power to generate AC power having 12 pulses. In this case, the primary and secondary coils of the transformer 161 of one of the two valve bridges may have a Y-Y connection, and the primary and secondary coils of the transformer 161 of the other of the two valve bridges may have a Y-Δ connection.

When three three-phase valve bridges 151a are used, the positive-pole DC/AC converter 151 may use positive-pole DC power to generate AC power having 18 pulses. The more the number of pulses of the AC power, the price of the filter may decrease.

The reception-side AC part 170 includes an AC filter 171 and an AC transmission line 173.

The AC filter 171 removes other frequency components excluding the frequency component (e.g., about 60 Hz) used by the reception part 180, from the AC power generated by the reception-side DC transformation part 105.

The AC transmission line 173 transmits filtered AC power to the reception part 180.

Figure 3:
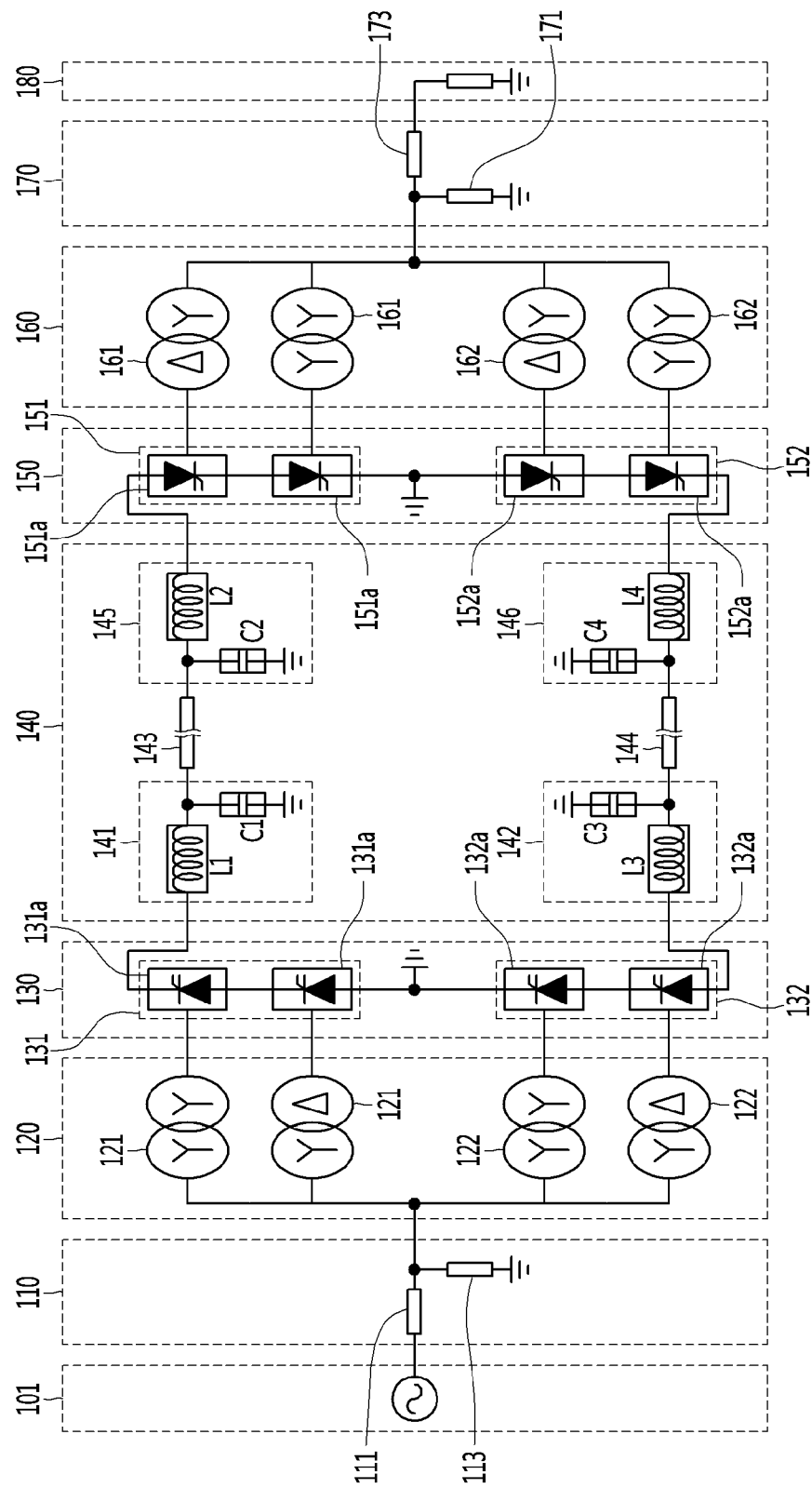
FIG. 3 is a diagram for explaining the configuration of a bi-polar HVDC transmission system according to an embodiment.

FIG. 3 shows a bipolar HVDC transmission system according to an embodiment.

In particular, FIG. 3 shows a system transmitting two-pole DC power. Although it is assumed in the following description that the two poles are a positive pole and a negative pole, there is no need to be limited thereto.

A transmission-side AC part 110 includes an AC transmission line 111 and an AC filter 113.

The AC transmission line 111 transmits three-phase AC power generated by a power generation part 101, to a transmission-side transformation part 103.

An AC filter 113 removes other frequency components excluding frequency components used by the transformation part 103, from the transmitted three-phase AC power.

A transmission-side transformer part 120 includes one or more transformers 121 for the positive pole and one or more transformers 122 for the negative pole. A transmission-side AC/DC converter part 130 includes an AC/positive-pole DC converter 131 generating positive-pole DC power and an AC/negative-pole DC converter 132 generating negative-pole DC power, the AC/positive-pole DC converter 131 includes one or more three-phase valve bridges 131a corresponding respectively to one or more transformers 121 for the positive-pole, and the AC/negative-pole DC converter 132 includes one or more three-phase valve bridges 132a corresponding respectively to one or more transformers 122 for the negative-pole.

When one three-phase valve bridge 131a is used for the positive pole, the AC/positive-pole DC converter 131 may use AC power to generate positive-pole DC power having six pulses. In this case, the primary and secondary coils of the transformer 121 of the valve bridge may have a Y-Y connection or Y-Δ connection.

When two three-phase valve bridges 131a are used for the positive pole, the AC/positive-pole DC converter 131 may use AC power to generate positive-pole DC power having 12 pulses. In this case, the primary and secondary coils of the transformer 121 of one of the two valve bridges may have a Y-Y connection, and the primary and secondary coils of the transformer 121 of the other of the two valve bridges may have a Y-Δ connection.

When three three-phase valve bridges 131a are used for the positive pole, the AC/positive-pole DC converter 131 may use AC power to generate positive-pole DC power having 18 pulses. The more the number of pulses of the positive-pole DC power, the price of the filter may decrease.

When one three-phase valve bridge 132a is used for the negative pole, the DC/negative-pole DC converter 132 may generate negative-pole DC power having six pulses. In this case, the primary and secondary coils of the transformer 122 of the valve bridge may have a Y-Y connection or Y-Δ connection.

When two three-phase valve bridges 132a are used for the negative pole, the AC/negative-pole DC converter 132 may generate negative-pole DC power having 12 pulses. In this case, the primary and secondary coils of the transformer 122 of one of the two valve bridges may have a Y-Y connection, and the primary and secondary coils of the transformer 122 of the other of the two valve bridges may have a Y-Δ connection.

When three three-phase valve bridges 132a are used for the negative pole, the AC/negative-pole DC converter 132 may generate negative-pole DC power having 18 pulses. The more the number of pulses of the negative-pole DC power, the price of the filter may decrease.

The DC transmission part 140 includes a transmission-side positive-pole DC filter 141, a transmission-side negative-pole DC filter 142, a positive-pole DC transmission line 143, a negative-pole DC transmission line 144, a reception-side positive-pole DC filter 145, and a reception-side negative-pole DC filter 146.

The transmission-side positive-pole DC filter 141 includes an inductor L1 and a capacitor C1 and DC-filters positive-pole DC power output by the AC/positive-pole DC converter 131.

The transmission-side negative-pole DC filter 142 includes an inductor L3 and a capacitor C3 and DC-filters negative-pole DC power output by the AC/negative-pole DC converter 132.

The positive-pole DC transmission line 143 may have a DC line for transmission of positive-pole DC power, and earth may be used as a current feedback path. One or more switches may be disposed on the DC line.

The negative-pole DC transmission line 144 may have a DC line for transmission of negative-pole DC power, and earth may be used as a current feedback path. One or more switches may be disposed on the DC line.

The reception-side positive-pole DC filter 145 includes an inductor L2 and a capacitor C2 and DC-filters positive-pole DC power transmitted through the positive-pole DC transmission line 143.

The reception-side negative-pole DC filter 146 includes an inductor L4 and a capacitor C4 and DC-filters negative-pole DC power transmitted through the negative-pole DC transmission line 144.

The reception-side DC-AC converter part 150 includes a positive-pole DC/AC converter 15 land a negative-pole DC-AC converter 152, the positive-pole DC/AC converter 151 includes one or more three-phase valve bridges 11a, and the negative-pole DC-AC converter 152 includes one or more three-phase valve bridges 152a.

The reception-side transformer part 160 includes one or more transformers 161 corresponding respectively to one or more three-phase valve bridges 151a for the positive pole and one or more transformers 162 corresponding respectively to one or more three-phase valve bridges 152a for the negative pole.

When one three-phase valve bridge 151a is used for the positive pole, the positive-pole DC/AC converter 151 may use positive-pole DC power to generate AC power having six pulses. In this case, the primary and secondary coils of the transformer 161 of the valve bridge may have a Y-Y connection or Y-Δ connection.

When two three-phase valve bridges 151a are used for the positive pole, the positive-pole DC/AC converter 151 may use positive-pole DC power to generate AC power having 12 pulses. In this case, the primary and secondary coils of the transformer 161 of one of the two valve bridges may have a Y-Y connection, and the primary and secondary coils of the transformer 161 of the other of the two valve bridges may have a Y-Δ connection.

When three three-phase valve bridges 151a are used for the positive pole, the positive-pole DC/AC converter 151 may use positive-pole DC power to generate AC power having 18 pulses. The more the number of pulses of the AC power, the price of the filter may decrease.

When one three-phase valve bridge 152a is used for the negative pole, the negative-pole DC/AC converter 152 may use negative-pole DC power to generate AC power having six pulses. In this case, the primary and secondary coils of the transformer 162 of the valve bridge may have a Y-Y connection or Y-Δ connection.

When two three-phase valve bridges 152a are used for the negative pole, the negative-pole DC/AC converter 152 may use negative-pole DC power to generate AC power having 12 pulses. In this case, the primary and secondary coils of the transformer 162 of one of the two valve bridges may have a Y-Y connection, and the primary and secondary coils of the transformer 162 of the other of the two valve bridges may have a Y-Δ connection.

When three three-phase valve bridges 152a are used for the negative pole, the negative-pole DC/AC converter 152 may use negative-pole DC power to generate AC power having 18 pulses. The more the number of pulses of the AC power, the price of the filter may decrease.

A reception-side AC part 170 includes an AC filter 171 and an AC transmission line 173.

The AC filter 171 removes other frequency components excluding the frequency component (e.g., about 60 Hz) used by the reception part 180, from the AC power generated by the reception-side DC transformation part 105.

The AC transmission line 173 transmits filtered AC power to the reception part 180.

Figure 4:
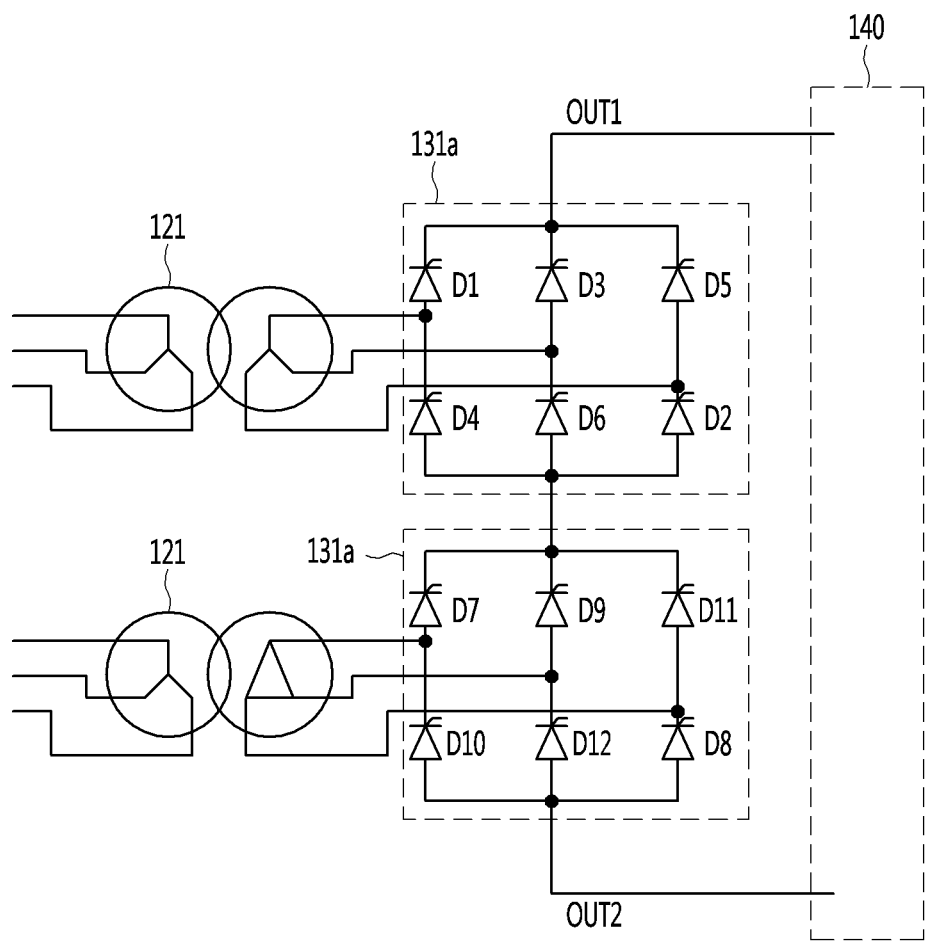
FIG. 4 is a diagram for explaining the connection of a transformer and a three-phase valve bridge according to an embodiment.

FIG. 4 shows the connection of a transformer and a three-phase valve bridge according to an embodiment.

In particular, FIG. 4 shows the connection of two transformers 121 for a positive pole and two three-phase valve bridges 131a for the positive pole. Since the connection of two transformers 122 for a negative pole and two three-phase valve bridges 132a for the negative pole, the connection of two transformers 161 for the positive pole and two three-phase valve bridges 151a for the positive pole, the connection of two transformers 162 for the negative pole and two three-phase valve bridges 152a for the negative pole, the connection of one transformer 121 for the positive pole and one three-phase valve bridge 131a for the positive pole, and the connection of one transformer 161 for the positive pole and one three-phase valve bridge 151a for the positive pole may be easily derived from the embodiment of FIG. 4, related drawings and descriptions are omitted.

In FIG. 4, the transformer 121 having a Y-Y connection is referred to as an upper transformer, the transformer 121 having a Y-Δ connection is referred to as a lower transformer, the three-phase valve bridge 131a connected to the upper transformer is referred to as an upper three-phase valve bridge, and the three-phase valve bridge 131a connected to the lower transformer is referred to as a lower three-phase valve bridge.

The upper three-phase valve bridge and the lower three-phase valve bridge have a first output OUT1 and a second output OUT2 that are two outputs outputting DC power.

The upper three-phase valve bridge includes six valves D1 to D6 and the lower three-phase valve bridge includes six valves D7 to D12.

The valve D1 has a cathode connected to the first output OUT1 and an anode connected to the first terminal of the secondary coil of the upper transformer.

The valve D2 has a cathode connected to the anode of the valve D5 and an anode connected to the anode of the valve D6.

The valve D3 has a cathode connected to the first output OUT1 and an anode connected to the second terminal of the secondary coil of the upper transformer.

The valve D4 has a cathode connected to the anode of the valve D1 and an anode connected to the anode of the valve D6.

The valve D5 has a cathode connected to the first output OUT1 and an anode connected to the third terminal of the secondary coil of the upper transformer.

The valve D6 has a cathode connected to the anode of the valve D3.

The valve D7 has a cathode connected to the anode of the valve D6 and an anode connected to the first terminal of the secondary coil of the lower transformer.

The valve D8 has a cathode connected to the anode of the valve D11 and an anode connected to the second output OUT2.

The valve D9 has a cathode connected to the anode of the valve D6 and an anode connected to the second terminal of the secondary coil of the lower transformer.

The valve D10 has a cathode connected to the anode of the valve D7 and an anode connected to the second output OUT2.

The valve D11 has a cathode connected to the anode of the valve D6 and an anode connected to the third terminal of the secondary coil of the lower transformer.

The valve D12 has a cathode connected to the anode of the valve D9 and an anode connected to the second output OUT2.

Figure 5:
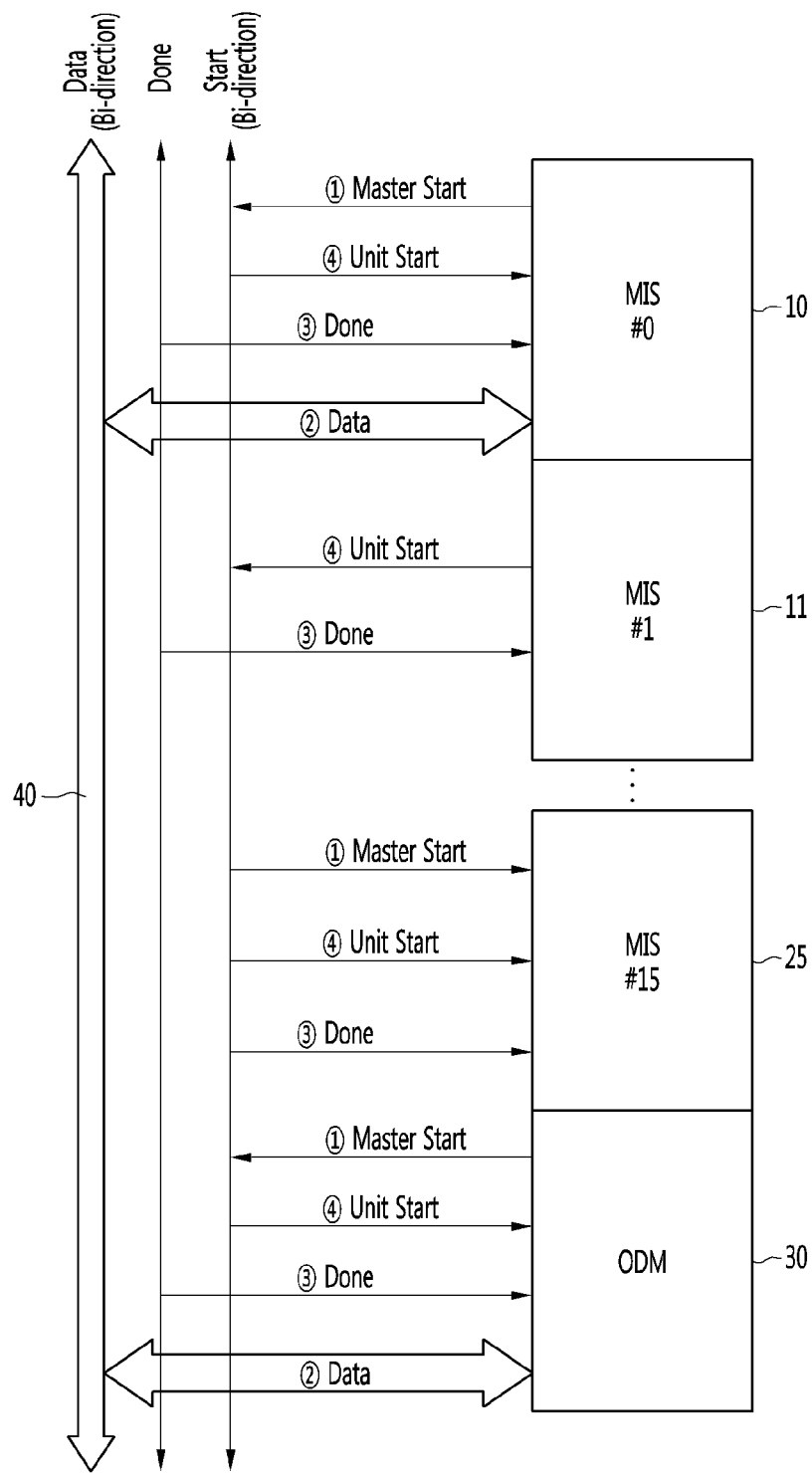
FIG. 5 is a diagram for explaining a data processing device and method for an HVDC transmission system according to an embodiment.

FIG. 5 is a diagram for explaining a data processing device and method for an HVDC transmission system according to an embodiment.

Referring to FIG. 5, the data processing device includes a plurality of measuring interface systems (MIS) 10 to 25 for measuring a voltage or current in the HVDC system. The embodiment illustrates 16 MISs but is not necessarily limited thereto and it is also possible to include n MISs. FIG. 5 illustrates a first MIS 10, a second MIS 11, and a sixteenth MIS 25, and third to fifteenth MISs are not shown.

The plurality of MISs 10 to 25 transmits a measurement of a voltage or current to an optical distribution module (ODM) 30 through a bus 40, and the ODM 30 transmits data from the plurality of MISs 10 to 25 to the HVDC system, e.g., to the control part of the HVDC system.

The data transmission by the data processing device according the embodiment is performed by the following processes.

The first MIS 10 outputs a first data transmission start signal Master Start before the data transmission, and remaining second to sixteenth MISs 11 to 25 excluding the first MIS 10 also output second to nth data transmission start signals Unit Start before the data transmission. The first data transmission start signal and the second to nth data transmission start signals are transmitted through the bus 40 and have different pulse widths. For example, the first data transmission start signal may have a two-time longer pulse width than the second to nth data transmission start signals. Thus, the plurality of MISs 10 to 25 may distinguish the first data transmission start signal of the second to nth data transmission start signals through the length of the pulse width.

Each of the plurality of MISs 10 to 25 may have a counter module that may discern which MIS is transmitting data.

Before transmitting data to the ODM 30, the first MIS 10 first outputs the first data transmission start signal Master Start and then the first data transmission start signal is input to other MISs 11 to 25 through the bus 40 as represented by arrow ① in FIG. 5. When the first data transmission start signal is input, the counter modules of the second to sixteenth MISs 11 to 25 reset a counter to 0.

The second to sixteenth MISs 11 to 25 may see from the first data transmission start signal that the first MIS 10 will transmit data, and as represented by arrow ② in FIG. 5, the first MIS 10 transmits data to the ODM 30 through the bus 40.

When the first MIS 10 completes data transmission, the ODM 30 outputs a data transmission completion signal Done as represented by arrow ③ n FIG. 5. The data transmission completion signal may have a pulse form and is input to the plurality of MISs 10 to 25. The counter modules of the plurality of MISs 10 to 25 increase counters by 1 when the data transmission completion signal is input. If the counter is 0, the counter is changed to 1 after the data transmission completion signal is input, thus the second MIS 11 has a turn performing data transmission.

Before transmitting data to the ODM 30, the second MIS 11 corresponding to the counter value outputs the second data transmission start signal Unit Start and then the second data transmission start signal is input to other MISs 10, and 12 to 25 through the bus 40 as represented by arrow ④ in FIG. 5. When the second data transmission start signal is input, the first, and third to sixteenth MISs 10, and 12 to 25 may see from the second data transmission start signal that the second MIS 11 will transmit data, and the second MIS 11 transmits data to the ODM 30 through the bus 40.

When the second MIS 11 completes data transmission, the ODM 30 outputs the data transmission completion signal Done and the signal is input to the plurality of MISs 10, and 12 to 25. The counter modules of the plurality of MISs 10, and 12 to 25 increase counters by 1 when the data transmission completion signal is input. If the counter is 1, the counter is changed to 2 after the data transmission completion signal is input, thus the third MIS 12 corresponding to the counter value has a turn performing data transmission.

By repeating these processes, data is transmitted to the sixteenth MIS 25.

In the case where the ODM 30 outputs the data transmission completion signal so that the counter modules of the plurality of MISs have a specific count value but an MIS corresponding to the specific count value is out of order or empty, a data transmission start signal is not output from a corresponding MIS and data transmission is not performed either, and a data transmission completion signal is not output from the ODM 30. In this case, the data transmission may no longer be performed.

Thus, when there is no data transmission start signal input for a certain time, the ODM 30 considers that the MIS corresponding to the specific count value has a trouble, and transmits the data transmission completion signal again. Thus, the counter module that each MIS includes increases a counter by 1 so that the following MISs excluding the MIS that has the trouble may transmit data.

As such, since the data processing device for the HVDC transmission system according to the embodiment transmits data by using a parallel bus structure, there are advantages in that data errors that may occur in the bypass process are minimized and it is possible to quickly transmit data.

Figure 6:
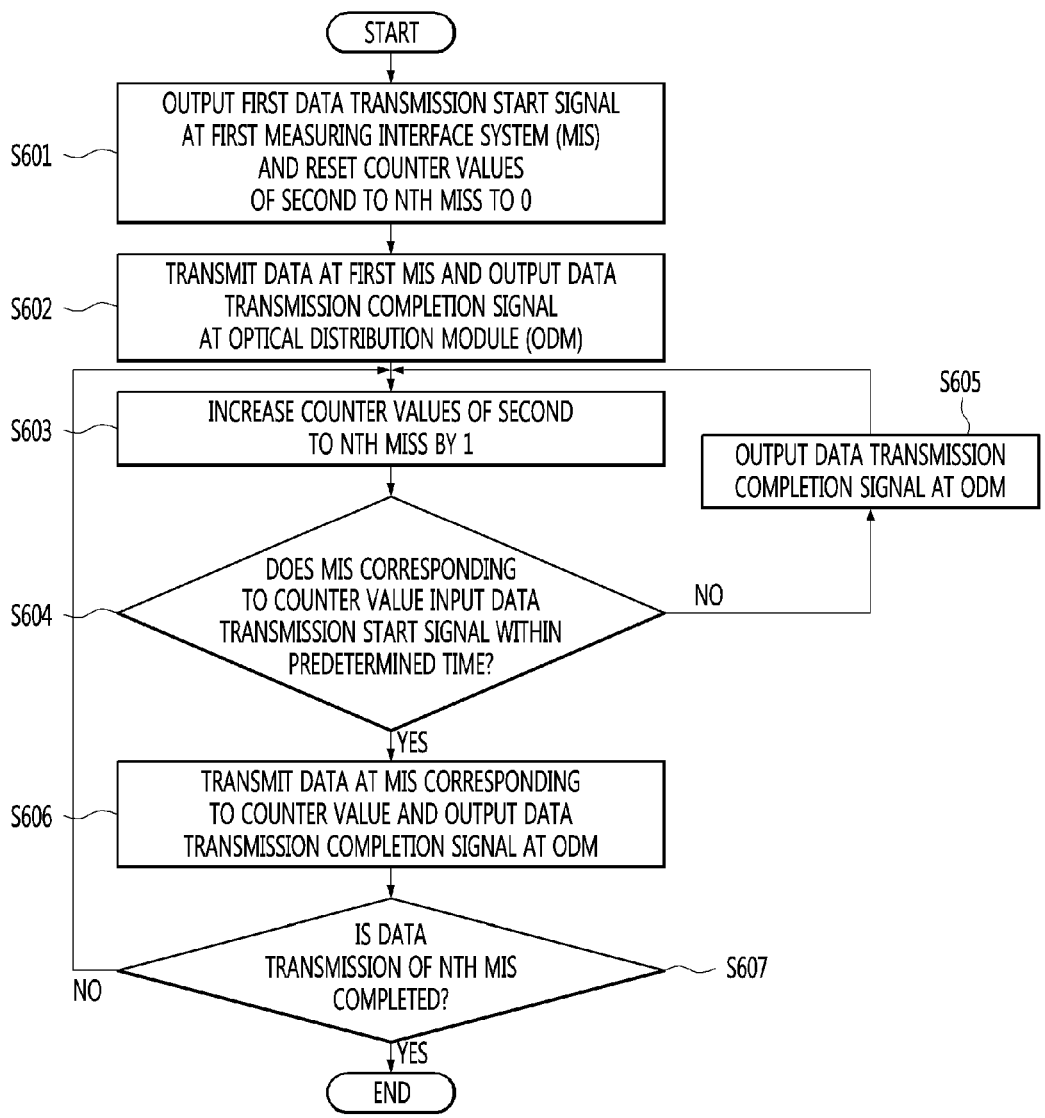
FIG. 6 is a flowchart of a data processing method for an HVDC transmission system according to an embodiment.

FIG. 6 is a flowchart of a data processing method for an HVDC transmission system according to an embodiment.

Referring to FIG. 6, when the first MIS 10 first outputs a first data transmission start signal Master Start, the counter modules of second to nth MISs, e.g., second to sixteenth MISs 11 to 25 reset a counter value to 0 in step S601.

When the first MIS 10 performs data transmission and the data transmission is completed, the ODM 30 outputs a data transmission completion signal in step S602.

The counter modules of the second to nth MISs, e.g., the second to nth MISs 11 to 25 increase counter values by 1 in step S603, and the ODM 30 senses whether a data transmission start signal Unit Start is input to an MIS corresponding to the counter value for a predetermined time, in step S604. For example, it is sensed whether second to sixteenth data transmission start signals are input to the second to sixteenth MISs 11 to 25.

If the data transmission start signal is not input for a predetermined time, the ODM 30 outputs a data transmission completion signal in step S605.

If the data transmission start signal is input for the predetermined time, an MIS corresponding to the counter value among the second to sixteenth MISs, e.g., the second to sixteenth MISs 11 to 25 transmits data and the ODM 30 outputs the data transmission completion signal in step S606.

After determining whether data transmission to the nth MIS, e.g., the sixteenth MIS 25 has been completed, data is sequentially transmitted and data transmission is ended when data transmission to the sixteenth MIS 25 has been completed.

Embodiments are mostly described above. However, they are only examples and do not limit the present disclosure. A person skilled in the art may appreciate that many variations and applications not presented above may be implemented without departing from the essential characteristic of embodiments. For example, each component particularly represented in embodiments may vary. In addition, it should be construed that differences related to such a variation and such an application are included in the scope of the present disclosure defined in the following claims.

What is claimed is:

1. A data processing device for a high voltage direct current (HVDC) transmission system, the data processing device comprising:
   a plurality of measuring interface systems (MIS) for measuring a voltage or current;
   a bus for transmitting data of the plurality of MISs to an optical distribution module (ODM); and
   the ODM sequentially transmitting the data transmitted through the bus from the plurality of MISs,
   wherein the plurality of MISs increase counter values by 1 according to a data transmission completion signal of the ODM, and an MIS, corresponding to the increased counter value among the plurality of MISs, transmits data to the ODM through the bus.

2. The data processing device according to claim 1, wherein a first MIS among the plurality of MISs outputs a first data transmission start signal, and each of remaining MISs among the plurality of MISs resets a counter value of a counter module according to the first data transmission start signal.

3. The data processing device according to claim 1, wherein a second MIS corresponding to the increased counter value outputs a data transmission start signal and then transmits data.

4. The data processing device according to claim 3, wherein in a case where the second MIS corresponding to the increased counter value having 1 does not output the data transmission start signal within a predetermined time, the ODM outputs a data transmission completion signal, and each of the plurality of MISs increases a counter value of the counter module by 1 according to the data transmission completion signal such that a third ODM corresponding to the increased counter value having 2 transmits data.

5. The data processing device according to claim 3, wherein a first data transmission start signal of the first MIS has a longer pulse width than data transmission start signals of the remaining MISs.

* * * * *